Figure 10:
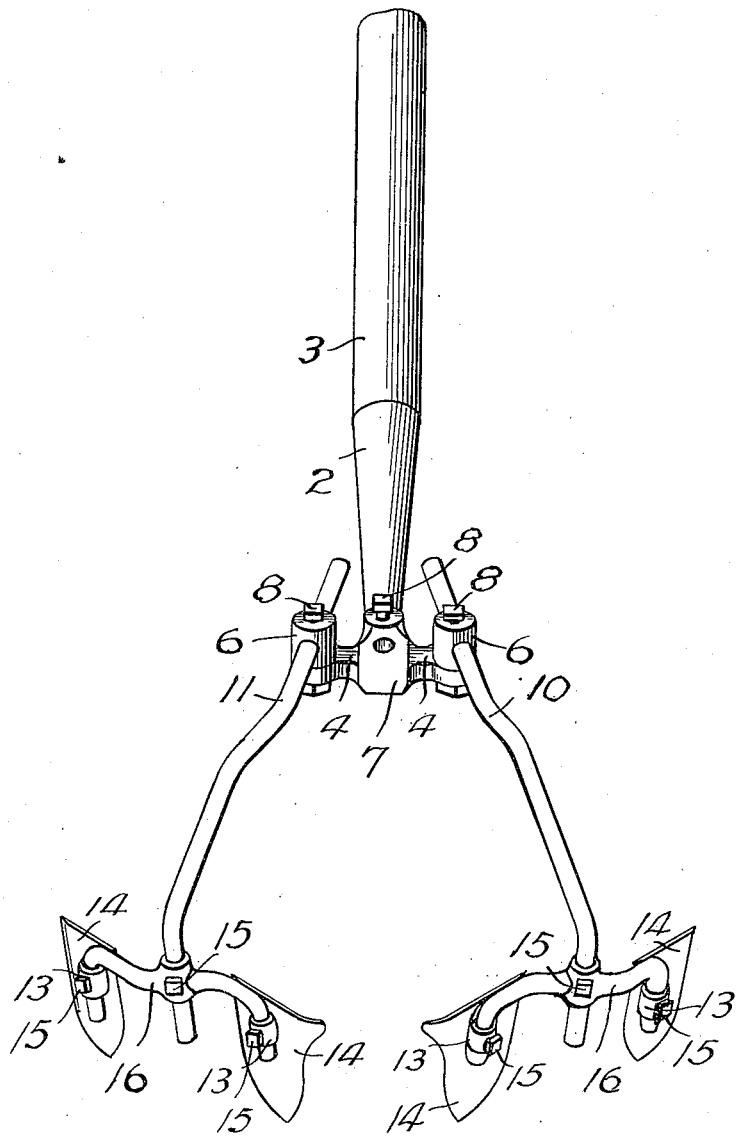

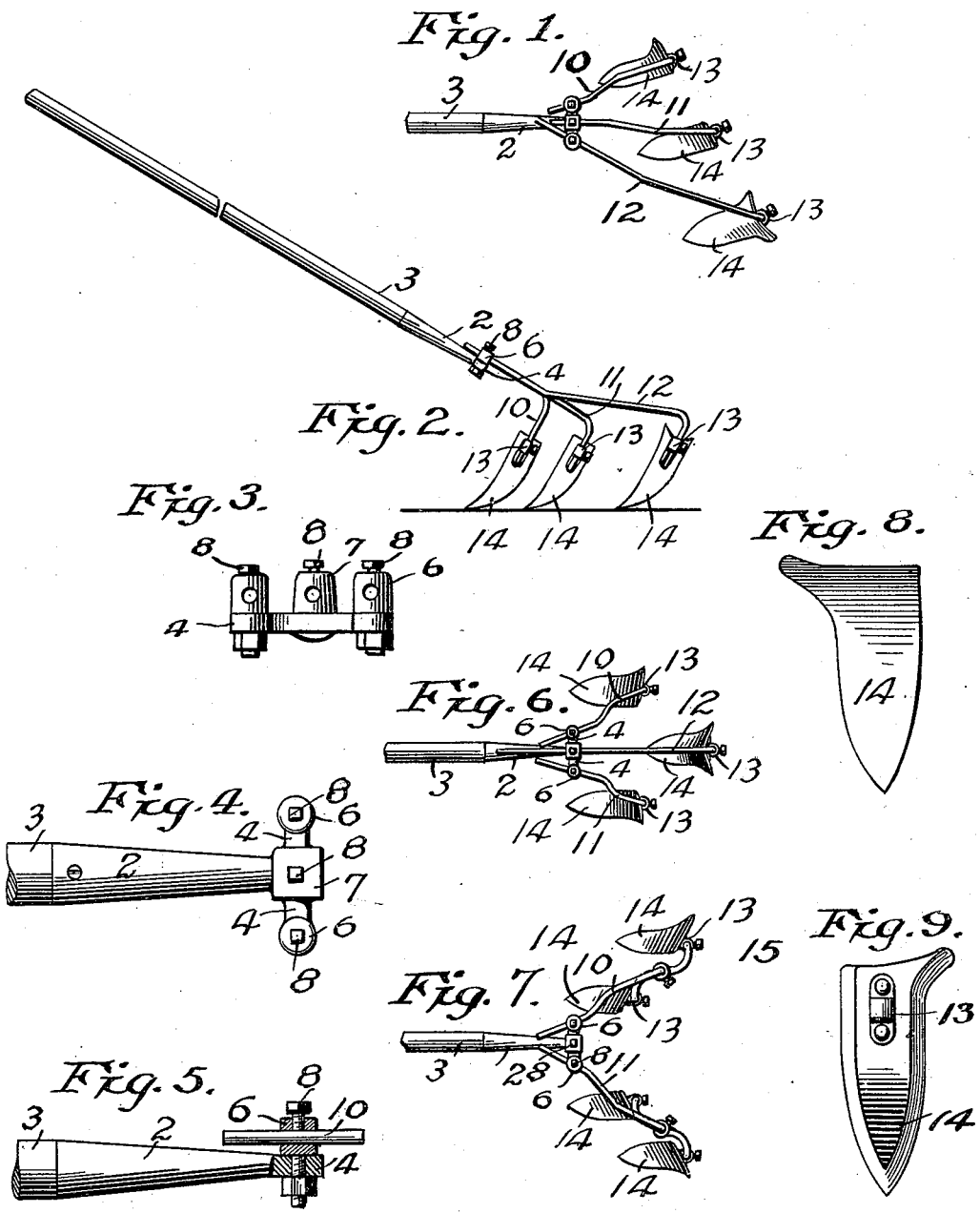

UNITED STATES PATENT OFFICE.

WILLIAM B. BACHELDER, OF BROOKLYN CENTRE, ASSIGNOR OF ONE-HALF TO GEORGE A. BROWN, OF MINNEAPOLIS, MINNESOTA.

HAND-CULTIVATOR.

SPECIFICATION forming part of Letters Patent No. 556,327, dated March 17, 1896.

Application filed August 3, 1895. Serial No. 558,108. (No model.)

*To all whom it may concern:*

Be it known that I, WILLIAM B. BACHELDER, of Brooklyn Centre, Hennepin county, Minnesota, have invented certain new and useful Improvements in Hand-Cultivators, of which the following is a specification.

My invention relates to cultivators for breaking and stirring up the soil between the rows of corn and vegetables, and the object I have in view is to provide a cultivator which may be operated by hand, which is provided with a series of rods or arms of different length carrying adjustable teeth or plows, and a head having swiveled parts wherein said rods or arms are adjustable to permit a change in the relative position of the plows or teeth and said swiveled parts permitting the adjustment of the rods or carrying-arms at any desired angle to the head proper.

My invention consists generally in various constructions and combinations, all as hereinafter described and particularly pointed out in the claims.

In the accompanying drawings, forming part of this specification, Figure 1 is a plan view of a hand-cultivator embodying my invention, a portion of the handle being broken away. Fig. 2 is a side view of the same. Fig. 3 is an end view of the head. Fig. 4 is a plan view of the same. Fig. 5 is a sectional view showing the method of securing the rods which support the adjustable teeth or plows in the heads. Fig. 6 is a plan view showing a different arrangement of the teeth or plows in the head. Fig. 7 is a similar view showing still another combination of the teeth or plows. Figs. 8 and 9 are views of the opposite sides of one of the teeth or plows. Fig. 10 is an end view of the device, showing a different arrangement of the plows or teeth in the head.

In the drawings, 2 represents the head proper of the cultivator provided with a suitable handle 3 and the laterally-extending arms 4 and 5, each provided at its outer end with a swiveled head portion 6, while between the heads 6 on the head proper 2 is arranged a similar but fixed head 7.

The fixed and swiveled head portions are each provided with an opening to receive an arm of the cultivator tooth or plow, and set-screws 8 and 9 are provided, by means of which the arms may be secured in any desired position.

Arms 10, 11 and 12 are provided having ends adapted to be secured in the openings provided in the fixed and swiveled heads and having their outer ends curved downwardly and adapted to fit into openings in the blocks 13 on the back of the plows or teeth 14. The blocks 13 are provided with set-screws 15, by means of which the teeth or plows may be secured at any desired angle on the arms.

As shown in the drawings, the arms or rods are of different length and curved to permit the plows or teeth to be adjusted at the same angle to the ground. The long arm may be placed in one of the swiveled heads, as shown in Fig. 1, or in the fixed central head, as shown in Fig. 6, according to the arrangement of the plows that the operator desires to make.

In addition to the arms above described I provide yokes 16 adapted to be secured to the downwardly-turned outer ends of the arms 10, 11 and 12, and by means of which the teeth may be adjusted at any angle to the arms and the head.

The teeth or plows are provided with beveled edges, and some of them are provided at the top with wings or projections which throw the dirt out at one side around the hills of corn and vegetables. These wings may be provided on one or both sides, as may be desired. In the drawings I have shown four plows ready for use, but a greater or less number may be used if desired.

The arms are all interchangeable, and the swivel-heads permit the adjustment of the heads at any angle to the head proper, so that the device can be readily adapted for use where the rows are not the same distance apart.

Having thus described my invention, I claim as new and desire to secure by Letters Patent—

1. A hand-cultivator, comprising a head 2, having a suitable handle, the blocks 6 and 7 provided on said head, the shanks 10, 11 and 12 arranged to slide in openings provided in said blocks, means for securing the same therein, said shanks having a depending outer end, the plows or teeth 14 provided with a socket to receive the depending end of said shanks, and whereon said plows are adjustably secured to permit vertical adjustment of the same, whereby the depth of the furrows may be varied, and said shanks being longitudinally adjustable to permit horizontal adjustment of said plows, whereby the position of the same with respect to the head may be changed at will, for the purpose set forth.

2. A hand-cultivator, comprising a head 2, having a suitable handle, the swiveled end blocks 6, and the fixed middle block 7 provided on said head, the short shanks 10 and 11, and the long shanks 12, said shanks being adapted to slide in openings provided in said blocks, whereby the position of the plows with respect to the head may be changed at will, means for securing said shanks in said blocks, said shanks having a depending outer end, the flattened plows or teeth having a pointed lower end, and provided with a socket to receive the depending end of the shanks whereon said plows may be adjusted at different distances from the ground, and at any angle with respect to each other and to the head, substantially as described, and for the purpose set forth.

In testimony whereof I have hereunto set my hand this 22d day of June, A. D. 1895.

WILLIAM B. BACHELDER.

In presence of—
C. G. HAWLEY,
RICHARD PAUL.